United States Patent Office 3,842,109
Patented Oct. 15, 1974

3,842,109
PREPARATION OF BETA-HALOGENOALKYL
ISOCYANATES
Klaus-Dieter Kampe, Frankfurt am Main, Germany, assignor to Farbwerke Hoechst Aktiengesellschaft vormals Meister Lucius & Bruning, Frankfurt, Germany
No Drawing. Application Nov. 4, 1970, Ser. No. 86,981, now abandoned, which is a continuation-in-part of application Ser. No. 727,347, May 7, 1968, now Patent No. 3,644,458, dated Feb. 22, 1972. Divided and this application Oct. 6, 1972, Ser. No. 298,805
Claims priority, application Germany, May 9, 1967, F 52,364
Int. Cl. C07c 119/04
U.S. Cl. 260—453 P 6 Claims

ABSTRACT OF THE DISCLOSURE

β-Halogenoalkyl isocyanates are prepared by a rearrangement of N-halgeno-β-lactams effected by radical-forming catalysts in the presence of unsaturated compounds as co-catalysts. The products are useful intermediate products of high reactivity due to their two reactive groups.

---

This application is a divisional application of application Ser. No. 86,981, filed Nov. 4, 1970 (now abandoned), which in turn is a continuation-in-part of application Ser. No. 727,347, filed May 7, 1968 (now U.S. 3,644,458, granted Feb. 22, 1972).

The present invention relates to a method for making β-halogenoalkyl isocyanates, especially β-bromoalkyl isocyanates.

It is known from French Pat. No. 1,340,810 to react β-amino alcohols with chlorocarbonic acid ethyl ester to obtain the β-hydroxyalkylethyl urethane, which is converted with thionyl chloride into β-chloroalkyl ethyl urethane and which yields β-chloroalkyl isocyanates after treatment with phosphorous pentachloride.

It now has been found that β-halogenoalkyl isocyanates of the general formula I

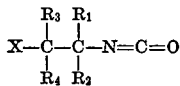

(I)

in which X is chlorine or, preferably, bromine, $R_1$ is hydrogen, alkyl of 1 to 13, preferably 1 to 10 carbon atoms, alkenyl of 2 to 13, preferably 2 to 4 carbon atoms, chloro- or bromoalkyl of 1 to 13, preferably 1 to 4 carbon atoms, cycloalkyl of 5 or 6 carbon atoms or phenyl, $R_2$, $R_3$ and $R_4$ are defined as $R_1$, preferably hydrogen or alkyl of 1 to 4 carbon atoms, and each two of the radicals $R_1$, $R_2$, $R_3$, and $R_4$ together are alkylene or alkenylene of each 3 to 6 carbon atoms or part of a bicyclic or tricyclic carbocyclic saturated or mono-unsaturated ring system of up to 13, preferably up to 10, carbon atoms, are obtained when contacting a lactam of the formula II

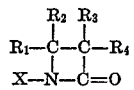

(II)

in which X, $R_1$, $R_2$, $R_3$ and $R_4$ are as defined above, with an effective amount of a free radical forming catalyst and an effective amount of a co-catalyst selected from the group consisting of an olefin and an acetylene at a temperature of about −30 to +250° C., preferably to about +10 to about +150° C.

Due to a rearrangement reaction according to the present process the formation of the isocyanates of formula I from the lactams of formula II takes place under the action of the radical donators.

For the process of the present invention, all compounds which have a β-lactam ring and which are substituted at the nitrogen atom of the lactam group by a bromine or chlorine atom may be used.

Preferred are such starting compounds of formula II, in which X stands for bromine, $R_1$ stands for alkyl of 1 to 10 carbon atoms, which is optionally substituted by chlorine or bromine, alkenyl of 2 to 4 carbon atoms or phenyl and $R_2$, $R_3$ and $R_4$ stand for hydrogen or alkyl or alkenyl of up to 3 carbom atoms each or wherein two of the radicals $R_1$, $R_2$, $R_3$ and $R_4$ are part of a saturated or mono-unsaturated cycloaliphatic ring or ring system of up to 10 carbon atoms.

Especially useful starting compounds are N-bromo lactams of formula II, in which $R_1$ is methyl, ethyl, propyl, butyl, chloromethyl, bromomethyl, vinyl or phenyl and $R_2$, $R_3$ and $R_4$ are hydrogen or methyl, furthermore such N-bromo azetidinones-(2) of formula II, in which $R_1$ and $R_3$ or $R_2$ and $R_4$, respectively, are part of a saturated or mono-unsaturated carbocyclic ring or of a bicyclic or tricyclic ring system with 5 to 10 carbon atoms.

Excluded are such β-lactams which contain in their molecule groups which could react with the isocyanate group which is formed during the rearrangement such as for example hydroxy or amino groups.

Especially suitable starting materials are N-bromo derivatives of 4 methyl, 4-ethyl, 4-butyl, 4-isobutyl, 4-dodecyl, 4-cyclohexyl, 4-chloromethyl, 4-bromomethyl, 4-β-chloroethyl, 4-phenyl, 4-p-methoxyphenyl, 4-p-fluorophenyl, 4-methyl-4-chloromethyl, 4-methyl-4-α,β-bromomethyl, 4-methyl-4-γ-chloropropyl, 4-methyl - 4 - α,β - dibromoethyl, 3,4-dimethyl, 3,4-dipropyl, 3-ethyl-4-methyl, 3,4-trimethylene, 3,4-tetramethylene, 3,4-hexamethylene, 3,3,4,4-bispentamethylene, 3,4,4-trimethyl, 3,3,4,4-tetramethyl or 4,4-bis-chloromethyl azetidinone-(2) and of the bicyclic and polycyclic azetidinones-(2) and bis-azetidinones-(2) of the formulae IV to XI in the following paragraph:

In order to explain more clearly the β-lactams which are appropriate for the process of the present invention where each two of the above stated radicals $R_1$, $R_2$, $R_3$ and $R_4$ may be part of rings or ring systems, the following β-lactams of formulae III through IX are given without restricting thereby the β-lactams of this type used as starting substances.

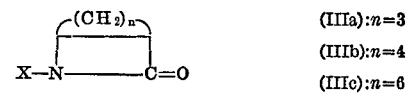

(IIIa):n=3
(IIIb):n=4
(IIIc):n=6

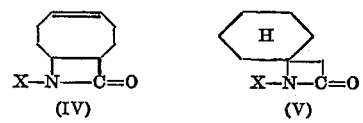

(IV)    (V)

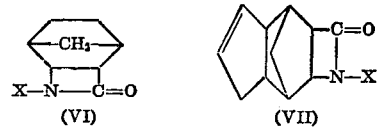

(VI)    (VII)

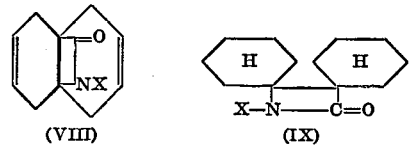

(VIII)    (IX)

Moreover, in principle, there may also be used dilactams of more complex structure, for example of the following formulae X and XI:

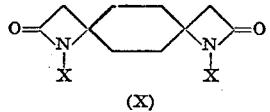 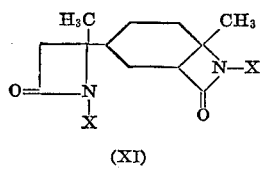

(X)         (XI)

The N-halogen-β-lactams are obtained from the corresponding lactams according to known methods, for example by direct halogenation in aqueous solution [cf. B. Taub and J. B. Hino, J. Org. Chem., 25,263 (1960); G. Caprara u.a., Ann. Chimica, 49, 1167 (1959)].

The β-lactams taken as basic substances can be prepared according to known methods, for example from the corresponding olefins and N-carbonyl-sulfamide acid chloride [cf. R. Graf, Angew. Chem. 80, 179 (1968), especially 183–185; Angew. Chem. Int. Ed., 7, 172 (1968)]. Thus there may be used as olefins especially α,α-disubstituted, α,α,β-trisubstituted and tetrasubstituted monoenes, but also aromatic substituted olefins of the styrene type. Moreover, there are suitable especially bicyclic and polycyclic mono- and polyenes, as well as allenes, α-substituted and α,β-disubstituted monoenes.

For the procedure of the rearrangement of the present invention, compounds which contain one or more C—C multiple bonds are necessary as cocatalysts. In principle all olefins and/or acetylenes may be used as cocatalysts which have one or several C—C double bonds and/or C—C triple bonds but no functional groups which would react with isocyanate groups. It is suitable to use olefins and acetylenes of 2 to 8, preferably 2 to 6 carbon atoms, having a simple structure and which are accessible without great technical expenditure, such as for example ethylene, acetylene, propene, butene-(1), butene-(2), 4-methylpentene-(1), butadiene, isoprene, allyl chloride, allyl bromide, methallyl chloride, vinyl chloride, vinyl ethyl ether or vinyl acetate or mixtures of these unsaturated compounds. Another reason for the suitability of these olefins and acetylenes is the possibility of separating them easily from the isocyanates by fractional distillation—if desired together with a solvent—at relatively low temperatures, considerably below the boiling point of the isocyanates which have formed.

The function of the unsaturated compounds in the process according to the present invention is not known. Since said compounds are necessary in the process but do not appear in any form in the products of the reaction they are characterized by the term co-catalysts throughout this specification.

As radical forming catalysts there may be used in the process of the present invention all compounds which decompose, while forming radicals, at temperatures in the range of from −30° to +250° C., preferably +10° and +150° C. Such radical formers preferred in the process of the present invention are for example organic peroxides and/or hydroperoxides, hydrogen peroxide, inorganic peroxide compounds and/or bisazoisobutyronitrile. Appropriate organic peroxides are for example di-tert.-butyl peroxide, dibenzoyl peroxide, dilauroyl peroxide, diisopropyl-percarbonate, tert.-butyl-hydroperoxide, cumyl-hydroperoxide, pinane-hydroperoxide, tert.-butyl perbenzoate and methyl ethyl ketone-peroxide.

It is of advantage to effect the rearrangement reaction of the N-bromo- or N-chloro-β-lactams n the presence of a solvent which is inert towards the isocyanate group. Especially suitable solvents are carbon tetrachloride, chloroform, methylene chloride, 1,2-dichloroethane, symmetric difluorotetrachloroethane, tetrachloroethylene and 1,4-dichlorobutane, or mixtures of these compounds. If the process of the invention is carried out in solution at temperatures above 100° C., it is advantageous to use as solvents hydrocarbons or ethers with a higher boiling point, such as for example dioxane or diglycol-dimethyl ether.

The preparation of the isocyanates of the present invention is extremely simple. The N-bromo-azetidinone-(2) or the N-chloro-azetidinone-(2) of formula II is left for a period of about 30 minutes to several days at an appropriate reaction temperature, preferably between +10° and +150° C., in the presence of catalytic amounts of the radical donor and with the addition of an olefin and/or acetylene as co-catalyst-preferably in the presence of one of the solvents mentioned above. The reaction velocity of the rearrangement reaction with formation of the β-bromo- or β-chloro-alkyl-isocyanates of formula I, increases with the reaction temperature, with the amount of catalysts and with the concentration of the olefin or acetylene component. The velocity of the rearrangement of the different N-bromo- and N-chloro-β-lactams is different. In general, the N-chloro-β-lactams rearrange much more slowly than the corresponding N-bromo-compounds. But the degree of substitution of the β-lactam ring also influences the rearrangement velocity. N-bromo- or N-chloro-β-lactams, for example, which are substituted in 3-position rearrange much better than compounds which are unsubstituted in this position. When choosing the reaction temperature it is of advantage to consider the thermal stability of the N-bromo- or N-chloro-β-lactams. These compounds are more or less thermally sensitive; in general, the N-chloro-compounds are thermally more stable than the corresponding N-bromo-compounds. The thermal stability increases with the degree of substitution of the N-bromo- or N-chloro-β-lactam.

Because of the aforementioned influences the optimum conditions for the rearrangement of the present invention for the different N-bromo- and N-chloro-β-lactams of formula II are very different; they are within a large range of temperature and require reaction times of different length, which depend especially on the concentration of the free-radical forming catalyst and on the reaction temperature.

After the rearrangement reaction, the solvent or the solvents, if present, are suitably removed by distillation in vacuo and the reaction products are subjected to a fractional vacuum distillation. In some cases different amounts of a solid by-product are obtained in the rearrangement reaction. In such cases the solvent, which may be present, is evaporated under normal or reduced pressure, the residue is digested with an ether which is liquid at room temperature and which has a low boiling point or with a $C_5$–$C_7$ hydrocarbon and the solution is filtered with suction from the solid substance. The isocyanates formed are then in solution and are obtained in pure form by fractional distillation.

The radical forming catalysts used in the process of the present invention are advantageously used in quantities of 0.002 to 1.5, preferably to 0.2, mol percent, referred to the N-bromo- or chloro-β-lactam quantity of formula II. Higher amounts may, of course, be used.

The olefins and/or acetylenes necessary as a co-catalyst for the process of this invention are suitable introduced in quantities of 0.02 to 3 moles per mole of N-bromo- or N-chloro-β-lactam of formula II. If the process is carried out without solvents, it is suitable to add the required C—C-unsaturated compound in quantities of 0.3 to 3 moles per mole of N-bromo- or N-chloro-β-lactam. When carrying through the process in the presence of the solvents described above, the amount of solvents used per mole of N-bromo- or N-chloro-β-lactam is, in principle, not limited. It is suitable to use the solvents in quantities of 0.3 to 50 parts by weight per part by weight of the N-bromo- or N-chloro-β-lactam to be rearranged.

The process of the present invention for preparing isocyanates of formula I, which is very simple in its practical application compared with the known isocyanate syntheses, shows a distinct difference from the methods hitherto described.

The field of application of the entirely novel process for the transposition of N-bromo- and N-chloro-azetidinones-(2) is very wide. The present invention permits the preparation of a great number of isocyanates having a variety of substituents in a simple way and in one reaction stage which hitherto have been very difficult to obtain or which could not be obtained at all.

The process of the present invention thus opened an approach to tertiary isocyanates having a reactive halogen, especially a bromine atom in the β-position to the isocyanate group. Furthermore, the process of this invention permits a simple synthesis of tertiary isocyanates having said reactive bromine atom in β-position and, moreover, a carbon-carbon double bond in β'-γ'-position to the isocyanate group.

These hitherto not accessible tertiary isocyanates show a diminished reactivity which allows selective reactions with nucleophilic reagents, e.g. reactions with amines in the presence of hydroxy compounds. Thus it is even possible to use an aqueous reaction medium without a substantial deterioration of the isocyanate or any considerable side reactions.

Said tertiary isocyanates have—in remarkable contradistinction to the primary and secondary isocyanates—no awkward smell and are not lachrymatory.

A further advantage of the tertiary isocyanate is that it is impossible to split off hydrogen bromide when reacting them with basic compounds, such as amines. Thus any side reactions with unsaturated isocyanates, e.g. polymerization, telomerization or addition reactions to the carbon-carbon double bond are avoided.

The process of the present invention opens a great number of possibilities for new syntheses involving the bromine or chlorine atom which is in β-position to the isocyanate group, thus considerably enlarging the manifold reactions which can be carried out with the isocyanate group. The β-bromo- and β-chloro-alkyl-isocyanates obtainable according to the process of the present invention thus present valuable intermediate products which can be used in many different ways, among others for the manufacture of compounds used in the field of plant protection and synthetic materials.

The reaction products can furthermore be converted in known manner by means of alcohols into the corresponding urethanes which, according to Katchalski, J. Org. Chem. 15, 1067 (1950), easily undergo thermal cyclization with separation of alkyl halides to form the 2-oxazolidones, which again react in known manner with formaldehyde to form 3-methylol-oxazolidone-2, which can be used in known manner for textile finishing. The reaction with 3-bromoalkyl isocyanates takes place in a single reaction stage.

The reaction of β-chloroalkyl isocyanates with primary amines, which is known from French Pat. No. 1,340,810, yields the corresponding ureas which can be converted into the blood-pressure influencing 2-amino-oxazolines after being isolated. Compared to this, the analogous reaction with the new β-bromo-alkyl isocyanates takes place in an extremely simple way in one reaction step, so that the cumbersome and high-loss isolation of the ureas is no longer necessary.

EXAMPLE 1

164 g. of 1-bromo-4-methyl-azetidinone-(2), 700 ml. of chloroform, 200 ml. of 1,2-dichloroethane, 130 ml. of methallyl chloride and 80 mg. of dibenzoyl peroxide are mixed and boiled for 24 hours at reflux, the temperature of the reaction mixture adjusting itself to 64° C. The reaction mixture is then concentrated in vacuo, advantageously in a rotating evaporator, at a bath temperature of 40° C. and the residue is distilled in vacuo. About 10 g. (67% of theory) of β-bromo-isopropyl-isocyanate are obtained; boiling point: 52° C. under 9–9.5 mm. of mercury, $n_D^{20}$: 1.471.

Elementary composition in percent: C. 29.6; H, 3.7; N, 8.7; Br, 49.2. Calculated for $C_4H_6BrNO$: C, 29.3; H, 3.7; N, 8.5; Br, 48.7. Molecular weight: 164.02; molecular weight found: 163.

EXAMPLE 2

A mixture of 658 g. of unpurified 1-bromo-4-methyl-azetidinone-(2) which is obtained by bromination of 4 moles (340 g.) of 4-methylazetidinone-(2), 1,200 ml. of chloroform, 400 ml. of methylene chloride, 188 g. of allyl chloride and 300 mg. of dilauroyl peroxide are boiled for 17 hours at reflux at an internal temperature of 57° C. The reaction mixture is subsequently subjected to fractional distillation over a column in vacuo. The β-bromo-isopropyl isocyanate which has formed distills over in gas-chromatographically pure form at 14 mm. Hg, at 58° C. 538 g. (82% of theory, referred to the 4-methyl-azetidinone-(2) used as starting substance) of pure β-bromo-isopropyl isocyanate (comp. data cf. Example 1) are obtained.

EXAMPLE 3

A mixture consisting of 32.8 g. of 1-bromo-4-methyl-azetidinone-(2), 20 ml. of allyl chloride and 50 mg. of cyclohexane-sulfonyl-acetyl peroxide is left for 2 days at 10° C. then a further 20 mg. of the cited peroxide are added and the mixture is left for another 2 days at 10° C. The allyl chloride is subsequently evaporated in vacuo at a bath temperature of 40° C. and the rest is distilled in vacuo according to the method described in Example 2. The distilled β-bromo-isopropyl-isocyanate is then purified by fractional distillation. 9 g. of pure isocyanate are obtained (28% of theory).

EXAMPLE 4

A mixture consisting of 328 g. of 1-bromo-4-methyl-azetidinone-(2), 400 ml. of chloroform, 250 ml. of methylene chloride, 57 ml. of allyl chloride and 180 mg. of dilauroyl peroxide is heated for 30 hours to 55° C. Working up is as described in Example 2. After redistillation, 220 g. (67% of theory) of pure β-bromo-isopropyl-isocyanate are obtained.

EXAMPLE 5

A mixture consisting of 32.8 g. of 1-bromo-4-methyl-azetidinone-(2), 150 ml. of n-hexane, 10 ml. of allyl chloride and 40 mg. of dilauroyl peroxide is heated for 24 hours under reflux. Working up then proceeds as described in Example 2. After redistillation of the crude isocyanate, 18 g. of pure β-bromo-isopropyl-isocyanate (55% of theory) are obtained.

EXAMPLE 6

A mixture of 82 g. (0.5 mole) of 1-bromo-4-methyl-azetidinone-(2), 250 ml. of chloroform, 9.4 g. (0.123 mole) of allyl chloride and 40 mg. of dibenzoyl peroxide is boiled for 18 hours under reflux, the temperature of the reaction mixture adjusting itself to 66° C. Working up is carried out as described in Example 2. 45 g. (55% of theory) of pure β-bromo-isopropyl-isocyanate are obtained.

EXAMPLE 7

A mixture of 98 g. (0.6 mole) of 1-bromo-4-methyl-azetidinone-(2), 42 g. (1 mole) of propene, 300 ml. of carbon tetrachloride and 30 mg. of dilauroyl peroxide are heated for 20 hours to 55° C. in an autoclave. Working up is then carried out as described in Example 2. 34 g. (35% of theory) of β-bromo-isopropyl-isocyanate are obtained.

EXAMPLE 8

Into a mixture of 98 g. (0.6 mole) of 1-bromo-4-methyl-azetidinone-(2), 300 ml. of carbon tetrachloride and 80 mg. of dilauroyl peroxide, propene is slowly introduced bubble by bubble, while stirring, during 8 hours at 55° C. When the saturation concentration of propene is reached, the excess propene is led off. The reaction mixture is then worked up as described in Example 2. After distilling twice, 59 g. (60% of theory) of pure β-bromo-isopropyl-isocyanate are obtained.

EXAMPLE 9

A mixture of 32.8 g. of 1-bromo-4-methyl-azetidinone-(2), 150 ml. of toluene, 15 g. of methacrylic acid methyl ester and 40 mg. of tert.-butyl perbenzoate is heated for 20 hours to the boiling point. Working up is then carried out as described in Example 2. After redistillation, 15 g. (46 percent of theory) of β-bromo-isopropyl-isocyanate are obtained.

EXAMPLE 10

A mixture of 32.8 g. of 1-bromo-4-methyl-azetidinone-(2), 150 ml. of carbon tetrachloride, 18 g. of diphenyl acetylene and 0.15 ml. of hydrogen peroxide (30% strength) is heated to the boiling point for 15 hours, the temperature of the reaction mixture adjusting itself to 83° C. By means of a rotating evaporator the solvent is then evaporated in vacuo and the residue is distilled in vacuo. 20 g. (60% of theory) of β-bromo-isopropyl-isocyanate are obtained. By recrystallization from ethanol 70% of the diphenyl acetylene introduced are regained from the distillation residue.

EXAMPLE 11

A mixture of 89 g. of 1-bromo-4-ethyl-azetidinone-(2) (0.5 mole), 200 ml. of chloroform, 91 g. of allyl chloride (1.2 moles) and 80 mg. of dilauroyl peroxide is heated for 24 hours under reflux, the temperature of the reaction mixture being 61° C. Working up is then carried out as described in Example 2. 53 g. (59% of theory) of 1-ethyl-2-bromo-ethyl-isocyanate are obtained. Boiling point: 68–68.5° C. under 10 mm. of mercury $n_D^{20}$: 1.472;

Elementary composition in percent: C, 34.0; H, 4.5; N, 8.1; Br 46.0; calculated for $C_5H_8BrNO$: C, 33.7; H, 4.5; N, 7.9; Br, 44.9; molecular weight: 178.04; molecular weight found: 177.

In analogous manner 1-n-decyl-2-bromo ethyl-isocyanate is obtained from 1-bromo-4-n-decyl-azetidinone-2 in a yield of 70%. Boiling point: 105–110° C. under 0.01 mm. of mercury; elementary composition in percent; C, 54.1; H, 8.4; Br, 27.9; N, 4.6; calculated for $C_{13}H_{24}BrNO$: C, 53.80; H, 8.33; Br, 27.53; N, 4.83; O, 5.51; molecular weight 290.25; molecular weight found: 289.

EXAMPLE 12

A mixture of 176 g. (1 mole) of 1-bromo-4-vinyl-azetidinone-(2), 700 ml. of carbon tetrachloride, 119 g. (1.3 moles) of methallylchloride and 80 mg. of dibenzoyl peroxide are boiled for 24 hours at reflux, the temperature of the reaction mixture being 79° C. The easily volatile part of the reaction mixture is then evaporated in a rotating evaporator in vacuo at a bath temperature of 40° C. The residue is mixed with about 400 ml. of ether and thoroughly stirred, whereby a solid product precipitates. This is filtered with suction and the filtrate is concentrated in vacuo at a bath temperature of 40° C. The remaining oily residue is then subjected to a distillation in vacuo as described in Example 2. After redistillation over a column, 98 g. (55% of theory) of 1-vinyl-2-bromoethyl-isocyanate are obtained.

Boiling point: 58° C. under a pressure of 7 mm. of mercury, $n_D^{20}$: 1.492; elementary composition in percent: C, 34.0; H, 3.20; N, 8.10; Br, 47.1; calculated for $C_5H_6BrNO$: C, 34.1; H, 3.4; N, 8.0; Br, 45.4; molecular weight: 176.04; molecular weight found: 175.

EXAMPLE 13

A mixture of 176 g. of 1-bromo-4-vinyl-azetidinone (2), 500 ml. of carbon tetrachloride, 100 ml. of methylene chloride, and 70 mg. of dilauroyl peroxide is heated for 10 hours under reflux. Working up is then carried out as described in Example 2. 77 g. of 1-vinyl-2-bromo-ethyl-isocyanate (39% of theory) are obtained.

EXAMPLE 14

A mixture of 176 g. of 1-bromo-4-vinyl-azetidinone-(2), 9.4 g. (0.12 mole) of allyl chloride, 500 ml. of carbon tetrachloride and 150 mg. of dilauroyl peroxide is heated for 24 hours to 60° C. Working up is then carried out as described in Example 2. 94 g. (54% of theory) of pure 1-vinyl-2-bromo-ethyl-isocyanate are obtained.

EXAMPLE 15

A mixture of 35.6 g. (0.2 mole) of 1-bromo-3,4-dimethyl-azetidinone-(2), 150 ml. of carbon tetrachloride, 10.2 g. (0.15 mole) of pentyne-(1) and 30 mg. of bis-azoisobutyronitrile is heated for 22 hours under reflux; the temperature of the boiling reaction mixture is 73° C. The mixture is then concentrated in vacuo and the residue distilled in vacuo. The 1,2-dimethyl-2-bromoethyl-isocyanate once distilled is redistilled over a column and then is obtained in pure form in a quantity of 27 g. (76% of theory).

Boiling point: 62° C. under 11 mm. of mercury, $n_D^{20}$: 1.473.

Elementary composition in percent: C, 33.9; H, 4.6; N, 8.3; Br, 47.0; calculated for $C_5H_8BrNO$: C, 33.7; H, 4.5; N, 7.9; Br, 44.9; molecular weight: 178.04; molecular weight found: 177.

EXAMPLE 16

A mixture of 35.6 g. of 1-bromo-3,4-dimethyl-azetidinone-(2), 150 ml. of carbon tetrachloride, 14 g. (0.16 mole) of vinyl acetate and 30 mg. of bis-azoisobutyronitrile is boiled for 20 hours under reflux, whereupon a solid product precipitates. By filtering with suction, the solid product is separated from the solution. The filtered solution is concentrated in vacuo at a bath temperature of 40° C. and then mixed with 200 ml. of ether, whereupon further amounts of the solid product precipitate. The solution is again filtered with suction from the solid product and again concentrated in vacuo. The oily residue is then distilled as described in Example 2. After redistillation, 22 g. (62% of theory) of 1,2-dimethyl-2-bromoethyl-isocyanate are obtained.

Examples 17 through 38 are summarized in the following table; in all cases it is 1-bromo-3,4-dimethyl-azetidione-(2) which is rearranged.

TABLE I

Rearrangements of 1-bromo-3,4-dimethyl-azetidinone-(2) (molecular weight 178) comprising Examples 17 through 38. Working up is carried out as described in Example 16

| Example | 1-bromo-3,4-dimethyl-azetidinone-(2), moles | Olefin- or acetylene component, mole | Solvent in ml. |
|---|---|---|---|
| 17 | 0.5 | 0.74 allyl chloride | 300 $CCl_4$, 150 $Cl-CH_2-CH_2-Clc$. |
| 18 | 2 | 0.7 allyl chloride | 800 $CCl_4$, 200 $CH_2Cl_2$. |
| 19 | 0.6 | 1.5 propene | 200 $CCl_4$. |
| 20 | 0.5 | 0.7 cyclohexene | 600 $CCl_4$. |
| 21 | 0.2 | 0.2 isoprene | 150 $CCl_4$. |
| 22 | 0.2 | 0.2 styrene | 150 $CCl_4$. |
| 23 | 0.2 | 0.15 phenyl acetylene | 150 $CCl_4$. |
| 24 | 0.2 | 0.15 vinylethylether | 150 $CCl_4$. |
| 25 | 0.2 | 0.14 vinylethylether | 150 $CHCl_3$. |
| 26 | 0.2 | do | 150 $CCl_4$. |
| 27 | 0.2 | do | 75 $CCl_4$, 75 $CHCl_3$. |
| 28 | 0.2 | 0.14 methyl acrylate | 150 $CCl_4$. |
| 29 | 0.2 | 0.12 allyl chloride | 150 $CHCl_3$. |
| 30 | 1 | 0.35 allyl chloride | 200 $CCl_4$, 200 $CH_2Cl_2$. |
| 31 | 0.2 | 0.12 allyl chloride | 150 $CHCl_3$. |
| 32 | 0.2 | do | 150 $CHCl_3$. |
| 33 | 0.2 | do | 150 benzene. |
| 34 | 0.2 | do | 150 hexane. |
| 35 | 0.2 | do | 150 tetrahydrofurane. |
| 36 | 0.2 | 0.24 allyl chloride | |
| 37 | 0.2 | do | 150 $CHCl_3$. |
| 38 | 0.2 | 0.12 allyl chloride | 150 $CHCl_3$. |

Rearrangements of 1-bromo-3,4-dimethyl-azetidinone-(2) (molecular weight 178) comprising Examples 17 through 38. Working up is carried out as described in Example 16

| Reaction time in hours | Reaction temperature in °C. | Catalyst radical donator in mg. | Yield of $Br-CH(CH_3)-CH(CH_3)-NCO$ In grams | In percent of theory |
|---|---|---|---|---|
| 20 | 72 | 40 dibenzoyl peroxide | 53 | 59 |
| 15 | 64 | 120 dibenzoyl peroxide | 214 | 60 |
| 24 | 62 | 50 dibenzoyl peroxide | 33 | 31 |
| 24 | 80 | 70 dibenzoyl peroxide | 40 | 44 |
| 6 | 72 | 30 bis-azoisobutyronitrile | 23 | 65 |
| 18 | 77 | do | 22 | 62 |
| 22 | 81 | do | 15 | 43 |
| 20 | 72 | do | 21 | 59 |
| 14 | 62 | 50 tert.-butylperbenzoate | 26 | 73 |
| 14 | 68 | 50 cumyl-hydroperoxide | 24 | 68 |
| 14 | 66 | 100 pinane-hydroperoxide (50% ig.). | 23 | 65 |
| 19 | 80 | 30 dibenzoyl peroxide | 18 | 51 |
| 2.5 | 64 | 150 perhydrol (30% strength) | 23 | 65 |
| 12 | 54 | 100 dilauroyl peroxide | 134 | 76 |
| 7 | 62 | 100 $K_2S_2O_8$* | 24 | 68 |
| 7 | 62 | 80 sodium per carbonate* | 24 | 68 |
| 17 | 64 | 30 dibenzoyl peroxide | 21 | 59 |
| 17 | 64 | 30 dilauroyl peroxide | 22 | 62 |
| 17 | 67 | 50 dilauroyl peroxide | 20 | 56 |
| 28 | 34 | 50 cyclohexanesulfonyl-acetylperoxide. | 27 | 76 |
| 14 | 22 | | | |
| 120 | 20 | 50 cyclohexanesulfonyl-acetylperoxide. | 10 | 28 |
| 5 | 63 | 40 $Na_2O_2$* | 20 | 57 |

*In these Examples 0.07 ml. of water was added.

EXAMPLE 39

While stirring for 2 hours at 65° C., gaseous vinyl chloride is slowly added, bubble by bubble, to a mixture of 89 g. of 1-bromo-3,4-dimethyl-azetidinone-(2), 400 ml. of carbon tetrachloride and 50 mg. of dilauroyl peroxide, then stirring is continued for another 2 hours, however, without the addition of vinyl chloride. Subsequently, the addition of vinyl chloride for 2 hours is repeated 3 times and then the whole is stirred again for 2 hours at 65° C. Working up is then carried out as described in Example 2. After distilling twice, 39 g. (44% of theory) of 1,2-dimethyl-2-bromo-ethyl-isocyanate are obtained.

EXAMPLE 40

To a mixture of 41 g. of 41 g. of 1-bromo-4-methyl-azetidinone-(2), 200 ml. of carbon tetrachloride, 50 mg. of sodium peroxide and 2 drops of water, gaseous butadiene-(1,3) is slowly added by bubble by bubble, while stirring for 6 hours at 55° C. When the saturation concentration is obtained, the excess butadiene is led off. Working up is then carried out as described in Example 2. After distilling twice in vacuo, 23 g. (56% of theory) of pure β-bromo-isopropyl-isocyanate are obtained.

EXAMPLE 41

While stirring at 65° C. ethylene is slowly led through a mixture of 89 g. of 1-bromo-4,4-dimethyl-azetidinone-(2), 400 ml. of carbon tetrachloride and 50 mg. of dilouroyl peroxide, bubble by bubble for 7 hours. Then a further 20 mg. of dilauroyl peroxide are added and the reaction mixture is kept for further 3 hours at 65° C. without the addition of ethylene. The reaction mixture is then concentrated in vacuo in a rotating evaporator at a bath temperature of 40° C. and then the oily residue is distilled. After redistillation over a column, 61 g. (69% of theory) of pure β-bromo-tert.-butyl-isocyanate are obtained.

Boiling point under a pressure of 9 mm. of mercury: 52° C., $n_D^{20}$: 1.463; elementary composition in percent: C, 33.4; H, 4.4; N, 8.1; Br, 46.0; calculated for $C_5H_8BrNO$: C, 33.7; H, 4.5; N, 7.9; Br, 44.9; molecular weight: 178.04; molecular weight found: 177.

EXAMPLE 42

Proceeding as in Example 41, acetylene instead of ethylene is led through the mixture. After working up and redistillation, 58 g. (65% of theory) of pure β-bromo-tert.-butyl-isocyanate are obtained.

EXAMPLE 43

A mixture of 715 g. of unpurified 1-bromo-4,4-dimethyl-azetidinone-(2), which was obtained by bromination of 4 moles (396 g.) of 4,4-dimethyl-azetidinone-(2), 1,200 ml. of chloroform, 400 ml. of methylene chloride, 188 g. of allyl chloride and 300 mg. of dilauroyl peroxide is boiled for 40 hours under reflux at an internal temperature of 57° C. The reaction mixture is then subjected to a fractional distillation over a column in vacuo. At 9 mg. of mercury and at 52° C., 604 g. (85% of theory, referred to 4 moles of 4,4-dimethylazetidinone-(2) as starting substance) of gas chromatographically pure β-bromo-tert.-butyl-isocyanate are obtained.

Examples 44 through 53 are summarized in the following Table II, where 1-bromo-4,4-dimethyl-azetidinone-(2) is rearranged.

TABLE II

Rearrangements of 1-bromo-4,4-dimethyl-azetidinone-(2) (molecular weight 178) comprising Examples 44 through 53. Working up is carried out as described in Example 41

| Example | 1-bromo-4,4-dimethyl-azetidinone-(2), moles | Olefin- or acetylene component, mole | Solvent in ml. |
|---|---|---|---|
| 44 | 0.2 | 0.4 allyl chloride | |
| 45 | 0.2 | 0.2 cyclohexane | 200 sinarol. |
| 46 | 0.6 | 1.0 propene | 200 CCl₄. |
| 47 | 0.2 | 0.15 acrylonitrile | 150 CCl₄. |
| 48 | 0.2 | 0.1 diphenyl acetylene | 150 CCl₄. |
| 49 | 0.2 | 0.2 allyl chloride | 50 benzene. |
| 50 | 0.2 | ..do.. | Do. |
| 51 | 0.2 | 0.15 mesityl oxide | 150 CHCl₃. |
| 52 | 0.2 | 0.2 allyl chloride | 450 CH₂Cl₂. |
| 53 | 0.5 | 1.0 isoprene | 200 CHCl₃. |

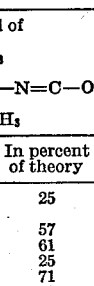

| Reaction time in hours | Reaction temperature in ° C. | Catalyst (radical donator) in mg. | Yield of Br—CH—C(CH₃)(CH₃)—N=C—O — In grams | In percent of theory |
|---|---|---|---|---|
| 240 | 5 | 100 cyclohexanesulfonyl-acetylperoxide | 9 | 25 |
| 3 | 140 | 50 di-tert.-butylperoxide | 20 | 57 |
| 20 | 60 | 80 dilauroyl peroxide | 61 | 61 |
| 18 | 76 | 30 tert. butylperbenzoate | 9 | 25 |
| 18 | 83 | 30 dibenzoyl peroxide | 25 | 71 |
| 120 | 35 | 250 diisopropylpercarbonate** | 18 | 50 |
| 48 | 50 | 200 methyl-ethylketone-peroxide*** | 22 | 62 |
| 17 | 67 | 50 dilauroyl peroxide | 18 | 51 |
| 30 | 41 | 100 sodiumborateperoxidehydrate* | 12 | 34 |
| 10 | 58 | 8 dilauroyl peroxide | 12 | 34 |

*0.07 ml. of water are added to the reaction mixture.
**A 20% solution in dibutyl maleate.
***A 50% solution in dimethyl phthalate.

EXAMPLE 54

A mixture of 90 g. (0.4 mole) of 1-bromo-4-phenyl-azetidinone-(2), 400 ml. of methylene chloride, 400 ml. of carbon tetrachloride, 73 g. (0.8 mole) of methallyl chloride and 30 mg. of dibenzoyl peroxide is heated for 5 hours to 54° C. The easily volatile substances of the reaction mixture are then evaporated in vacuo at a bath temperature of 40° C. The viscous oily residue is distilled at a pressure of 1 mg. of mercury in 3 aliquot portions in a bulb tube. A considerable amount of distillation residue remains. The collected distillates are redistilled in a bulb tube, whereupon 35 g. (39% of theory) of 1-phenyl-2-bromo-ethyl-isocyanate are obtained. The substance distills in the bulb tube at 1 mg. of mercury at a bath temperature of 75–83° C.

Elementary composition in percent: C, 47.6; H, 3.5; N, 6.3; Br, 37.3; calculated for C₉H₈BrNO: C, 47.8; H, 3.6; N, 6.2; Br, 35.3; molecular weight: 226.08; molecular weight found: 225.

EXAMPLE 55

A mixture of 54 g. (0.4 mole) of 1-chloro-4,4-dimethyl-azetidinone-(2), 400 ml. of 1,2-dichloroethane, 36.7 g. (0.4 mole) of methallyl chloride and 60 mg. of dibenzoyl peroxide is heated for 10 days to 70° C., after each day another 10 mg. of dibenzoyl peroxide are added. Working up is then carried out as described in Example 1. After redistillation, 26 g. (48% of theory) of β-chloro-tert.-butyl-isocyanate are obtained. Boiling point under a pressure of 20 mm. of mercury: 50° C., $n_D^{20}$: 1.442; elementary composition in percent: C, 44.8; H, 6.0; N, 10.6; Cl, 27.2; calculated for C₅H₈ClNO: C, 45.0; H, 6.0; N, 10.4; Cl, 26.5; molecular weight: 133.58; molecular weight found: 133.

EXAMPLE 56

A mixture of 66 g. of unpurified 1-bromo-4-methyl-4-n-propyl-azetidinone-(2), obtained by bromination of 0.3 mole (38 g.) of 4-methyl-4-n-propyl-azetidinone-(2), 300 ml. of chloroform, 28 g. of allyl chloride and 60 mg. of dibenzoyl peroxide is boiled for 17 hours under reflux at an internal temperature of 61° C. The solvent and the allyl chloride are then evaporated in vacuo in a rotating evaporator and the remaining crude 1-methyl-1-propyl-2-bromoethyl-isocyanate is distilled over a column. 52 g. (84% of theory, referred to 0.3 mole of 4-methyl-4-n-propyl-azetidinone-(2) as starting substance) of pure 1-methyl-1-n-propyl-2-bromoethyl-isocyanate are obtained.

Boiling point under a pressure of 6 mm. of mercury: 74–75° C. $n_D^{20}$: 1.468. Elementary composition in percent: C, 41.1; H, 5.9; Br, 39.0; N, 7.1; calculated for C₇H₁₂BrNO: C, 40.79; H, 5.87; Br, 38.78; N, 6.80; molecular weight: 206.10; molecular weight found: 205.

EXAMPLE 57

A mixture of 150 g. of unpurified N-bromo-3,4-tetramethylene-azetidinone-(2), obtained by bromination of 89 g. (0.7 mole) of 3,4-tetramethylene-azetidinone-(2), 200 ml. of chloroform, 65 ml. of methylene chloride, 31 g. (0.4 mole) of allyl chloride and 50 mg. of dilauroyl peroxide is heated for 20 hours under reflux at an internal temperature of 57° C. The reaction mixture is then subjected to fractional distillation in vacuo. The 1-isocyanate- 2-bromo-cyclohexane (2-bromo-cyclohexylisocyanate) which has formed distills over at 0.1 mm. of mercury and at 43° C. 117 g. (81% of theory referred to 3,4-tetramethylene-azetidinone-(2) as starting substance) of pure isocyanate are obtained, $n_D^{20}$: 1.5100. Elementary composition in percent: C, 41.3; H, 4.9; N, 7.0; Br, 39.4; calculated for $C_7H_{10}BrNO$: C, 41.20; H, 4.94; N, 6.86; Br, 39.16; molecular weight: 204.07; molecular weight found: 203.

EXAMPLE 58

A mixture of 26 g. of unpurified N-bromo-3,4-(3a'.4'.5'.6'.7'.7a' - hexahydro - 4'.7'. - methano - indeno)-azetidinone-(2)

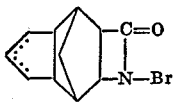

obtained by bromination of 0.1 mole of the corresponding lactam, 60 ml. of chloroform, 20 ml. of methylene chloride, 4.7 g. of allyl chloride and 20 mg. of dilauroyl peroxide is heated for 15 hours at 56° C. internal temperature under reflux. The solvents and the allyl chloride are then distilled off under vacuo. The isocyanate which has formed is subsequently distilled in a high-vacuum in a short-way distillation apparatus. 7 g. (28% of theory referred to 0.1 mole of the corresponding β-lactam as starting substance) of 6(5)-bromo-5(6)-isocyanato-3a.4.5.6.7.7a-hexahydro-4,7-methano-indene are obtained. Boiling point under a pressure of 0.02 mm. of mercury: 116° C.; $n_D^{20}$: 1.5530; melting point: 27–28° C. Elementary composition in percent: C, 52.2; H, 4.9; Br, 32.0; N, 5.3; calculated for $C_{11}H_{12}BrNO$: C, 51.99; H, 4.76; Br, 31.44; N, 5.52; molecular weight: 254.14; molecular weight found: 253.

EXAMPLE 59

A mixture of 217 g. of unpurified 1-bromo-4-chloromethyl-4-methyl-azetidinone-(2), obtained by bromination of 1 mole (133.5 g.) of 4-chloromethyl-4-methyl-azetidinone-(2), 300 ml. of chloroform, 100 ml. of methylene chloride, 47 g. of allyl chloride and 75 mg. of dilauroyl peroxide is heated for 40 hours under reflux at an internal temperature of 57° C. The reaction mixture is then subjected to fractional distillation in vacuo. The β-chloro-β'-bromo-tert.-butyl-isocyanate passed over at 5 mm. of mercury and at 61° C. 149 g. of pure product are obtain (70% of theory, referred to 4-chloro-methyl-4-methyl-azetidinone-(2) as starting substance); $n_D^{20}$: 1.4973. Elementary composition in percent: C, 28.0; H, 3.3; Br, 38.2; Cl, 17.0; N, 6.3; calculated for $C_5H_7BrClNO$: C, 28.26; H, 3.32; Br, 37.61; Cl, 16.68; N, 6.59. Molecular weight: 212.48; molecular weight found: 211.

EXAMPLE 60

A mixture of 96 g. (0.5 mol) of crude N-bromo-3,4-trimethylene-azetidinone-(2), 200 cc. of 4-methylpentene-(1) and 0.4 g. of dilauroyl peroxide was heated for 90 minutes under reflux. Subsequently, the volatile constituents were distilled off in vacuo and the residue distilled over a packed column in vacuo. There were obtained 71 g. (75% of the theory) of 2-bromo-cyclopentyl isocyanate as a mixture of cis/trans isomers, boiling at 86.5 to 88° C. at a pressure of 14 mm. Hg. The ratio of cis to trans isomers was evaluated by gas chromatography as 17:83; $n_D^{20}$ (of the mixture of stereo isomers) 1.5039; elementary composition in percent: C, 37.8; H, 4.2; Br, 42.3; N, 7.5; calculated for $C_6H_8BrNO$: C, 37.9; H, 4.25; Br, 42.0; N, 7.4; molecular weight 190.05, found 190.

EXAMPLE 61

A mixture of 2 cc. of a 44% (by weight) solution of diisopropyl percarbonate in carbon tetrachloride and 50 cc. of methylene chloride was added dropwise to a refluxing mixture of 234 g. (1 mol) of crude N-bromo-3,4-hexamethylene-azetidinone-(2), as obtained from the bromination of 1 mol of 3,4-hexamethylene-azetidinone-(2), 300 cc. of methylene chloride and 100 cc. of methallyl chloride. The so obtained mixture was refluxed for further 2 hours. Subsequently, the volatile components were removed in vacuo and the residue fractionated over a column. At 72 to 75° C. and at a pressure of 0.01 mm. Hg, 160 g. of pure 2-bromo-cyclo-octyl isocyanate (69% of the theory) distilled over (mixture of cis/trans isomers), $n_D^{20}$ 1.5198; elementary composition in percent: C, 46.5; H, 6.1; Br, 34.2; N, 6.3; calculated for $C_9H_{14}BrNO$: C, 46.56; H, 6.08; Br, 34.43; N, 6.03; molecular weight 232.13; found 232.

EXAMPLE 62

In the same way as described in Example 61, a mixture of 1 cc. of a 44% (by weight) solution of diisopropyl percarbonate in carbon tetrachloride and 20 cc. of methylene chloride was added dropwise to a refluxing mixture of 117 g. (0.5 mol) of crude N-bromo-2-amino-cyclooct-5-ene-1-carboxylic acid lactame (N-bromo-3,4-(1',6'-hex-3'-enylene)-azetidinone-(2)), 180 cc. of methylene chloride and 50 cc. of methallyl chloride and refluxed for further 2 hours. Fractionated distillation yielded 63 g. (55% of the theory) of pure 2-bromo-cyclooct-5-enylisocyanate boiling at 87 to 88° C. at a pressure of 0.05 mm. Hg; $n_D^{20}$ 1.5308; elementary composition in percent: C, 47.1; H, 5.5; Br, 54.4; N, 6.4; calculated for $C_9H_{12}BrNO$: C, 47.0; H, 5.26; Br, 34.7; N, 6.1; molecular weight 230.11; found 230.

EXAMPLE 63

A mixture of 192 g. (1 mol) of crude N-bromo-4-methyl-4-vinyl-azetidinone-(2), 400 cc. of chloroform, 200 cc. of 4-methylpentene-(1) and 0.6 g. of dilauroyl peroxide was refluxed for 4 hours. Subsequently the volatile components were removed in vacuo and the residue fractionated in vacuo. There were obtained 139 g. (73% of the theory) of pure 1-vinyl-1-methyl-2-bromo-ethyl-isocyanate, boiling at 72° C. at a pressure of 14 mm. Hg; $n_D^{20}$ 1.4830; elementary composition percent: C, 38.0; H, 4.2; N, 7.6; Br, 42.3; calculated for $C_6H_8BrNO$: C, 37.95; H, 4.25; Br, 42.1; N, 7.37; molecular weight 190.05; found 190.

EXAMPLE 64

To a refluxing mixture of 96 g. (0.5 mol) of crude N-bromo-4-methyl - 4 - vinyl-azetidinone-(2) and 250 cc. of 4-methyl-pentene-(1), a mixture of 1 cc. of a 44% (by weight) solution of diisopropyl percarbonate in carbon tetrachloride and 20 cc. of methylene chloride was added dropwise during 10 minutes. Subsequently the mixture was refluxed for further 90 minutes and the 1-vinyl-1-methyl-2-bromo-ethyl isocyanate formed was isolated as described in Example 63. The yield was 70 g. (74% of the theory).

EXAMPLE 65

A mixture of 56 g. of unpurified N-bromo-3,3-dimethyl-azetidinone-(2), obtained by bromination of 0.3 mole (30 g.) of 3,3-dimethyl-azetidinone-(2), 450 ml. of chloroform, 34 g. of allyl chloride and 45 mg. of dibenzoyl peroxide is boiled for 4 hours under reflux at 61° internal temperature. The reaction mixture is then subjected to fractional distillation in vacuo. The 2-bromo-2-methyl-propyl-isocyanate which has formed distills over a 4 mm. of mercury and at 46–47° C. 21 g. (39% of theory, referred to 0.3 mole of 3,3-dimethyl-azetidinone-(2) as starting substance) of gas chromatographically pure 2-bromo-2-methyl-propyl-isocyanate (Br—C(CH$_3$)$_2$—CH$_2$—NCO) are obtained. $n_D^{20}$: 1.473; elementary composition in percent: C, 33.7; H, 4.6; Br, 44.5; N, 8.0; calculated for $C_5H_8BrNO$: C, 33.73; H, 4.54; N, 7.87; Br, 44.88; molecular weight: 178.04; molecular weight found: 177.

I claim:
1. A process for the preparation of a β-haloalkylisocyanate of the formula

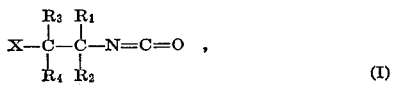
(I)

wherein X is chlorine or bromine and $R_1$, $R_2$, $R_3$ and $R_4$, taken alone, are hydrogen, alkyl of 1 to 13 carbon atoms, alkenyl of 2 to 13 carbon atoms, chloroalkyl of 1 to 13 carbon atoms, bromoalkyl of 1 to 13 carbon atoms, cycloalkyl of 5 or 6 carbon atoms, or phenyl, and wherein $R_1$, $R_2$, $R_3$, and $R_4$, taken pairwise, are alkylene or alkenylene of 3 to 6 carbon atoms or part of a bicyclic or tricyclic carbocyclic saturated or mono-unsaturated ring system of up to 13 carbon atoms, which process comprises contacting, at a temperature of about −30° C. to about +250° C., a lactam of the formula

(II)

wherein X, $R_1$, $R_2$, $R_3$ and $R_4$ are as defined above, with from 0.002 to 1.5 mol percent, per mole of lactam, of a free-radical forming catalyst and with from 0.2 to 3 mols, per mol of lactam, of a co-catalyst selected from the group consisting of olefins and acetylenes free of isocyanate-reactive functional groups.

2. The process as claimed in claim 1, wherein the reaction temperature is +10 to +150° C.

3. The process as claimed in claim 1, wherein 0.002 to 0.2 mol percent of said free-radical forming catalyst are used per mol of lactam.

4. The process as claimed in claim 1, wherein said co-catalyst is a member selected from the group consisting of an alkene, alkyne, alkadiene, haloalkene, carboalkoxyalkene, cyanoalkene, carboxylic acid vinyl ester, vinyl ketone, or vinyl ester, each of at most 8 carbon atoms.

5. The process as claimed in claim 1, wherein said free-radical forming catalyst is a member selected from the group consisting of hydroperoxide, an inorganic peroxide, an organic peroxide, an organic hydroperoxide or bis-azoisobutyronitrile.

6. The process as claimed in claim 1 wherein said lactam, catalyst, and co-catalyst are contacted in a solvent or mixture of solvents.

References Cited
UNITED STATES PATENTS
3,275,618   9/1966   Tilley et al. _____ 260—453 X LEWIS GOTTS, Primary Examiner
D. H. TORRENCE, Assistant Examiner U.S. Cl. X.R.
204—158; 260—239 A, 307 R, 453 AR, 453 AL